(12) United States Patent
Wagner et al.

(10) Patent No.: US 7,643,541 B2
(45) Date of Patent: Jan. 5, 2010

(54) DEVICE AND METHOD FOR DETERMINING A CORRELATION VALUE

(75) Inventors: Carmen Wagner, Langensendelbach (DE); Holger Stadali, Erlangen (DE); Guenter Hofmann, Litzendorf (DE); Marco Breiling, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 593 days.

(21) Appl. No.: 11/300,026

(22) Filed: Dec. 13, 2005

(65) Prior Publication Data

US 2006/0159205 A1    Jul. 20, 2006

(30) Foreign Application Priority Data

Dec. 13, 2004   (DE) .................. 10 2004 059 958

(51) Int. Cl.
*H04B 17/02* (2006.01)
*H04B 1/69* (2006.01)

(52) U.S. Cl. ..................................... 375/150; 375/130

(58) Field of Classification Search ................. 375/150, 375/343, 130, 340, 316, 142, 147; 708/422, 708/426
See application file for complete search history.

(56) References Cited

U.S. PATENT DOCUMENTS

| 5,090,028 | A | 2/1992 | Crebouw |
| 5,579,338 | A | 11/1996 | Kojima et al. |
| 6,009,334 | A | 12/1999 | Grubeck et al. |
| 6,424,683 | B1 | 7/2002 | Schollhorn |
| 6,788,731 | B2* | 9/2004 | Kim et al. ................ 375/142 |
| 6,819,707 | B2* | 11/2004 | Abraham et al. .......... 375/142 |
| 6,999,533 | B2* | 2/2006 | Murthy et al. ............ 375/343 |
| 2003/0053558 | A1 | 3/2003 | Unger et al. |
| 2003/0128161 | A1 | 7/2003 | Oh et al. |
| 2003/0215035 | A1 | 11/2003 | Amerga et al. |

(Continued)

FOREIGN PATENT DOCUMENTS

DE    19802373 C1    1/1998

(Continued)

OTHER PUBLICATIONS

Li, Xinrong, et al.; Super-Resolution TOA Estimation With Diversity for Indoor Geolocation; Jan. 1, 2004; IEEE.

(Continued)

*Primary Examiner*—Khai Tran
(74) *Attorney, Agent, or Firm*—Michael A. Glenn; Glenn Patent Group

(57) ABSTRACT

A device for determining a correlation value from a correlation between a first sequence of values with complex values and a second sequence of values with complex values has a correlation means for determining a first partial correlation value from a correlation between a first subset of the first sequence of values and a first subset of the second sequence of values, and for determining a second partial correlation value from a correlation between a second subset of the first sequence of values and a second subset of the second sequence of values. The device further has a processing means for determining a processed partial correlation value with an adjusted phase term from the first partial correlation value or the second partial correlation value, and a calculating means for determining the correlation value using the processed partial correlation value.

15 Claims, 21 Drawing Sheets

U.S. PATENT DOCUMENTS

| | | |
|---|---|---|
| 2003/0227895 A1 | 12/2003 | Strutt et al. |
| 2004/0072579 A1 | 4/2004 | Hottinen |
| 2004/0131031 A1 | 7/2004 | Stehle et al. |
| 2004/0203871 A1 | 10/2004 | Geier et al. |

FOREIGN PATENT DOCUMENTS

| | | |
|---|---|---|
| DE | 102 49 413 | 5/2004 |
| EP | 0 632 577 | 1/1995 |
| EP | 0 930 704 A2 | 11/1998 |
| EP | 0 933 882 | 8/1999 |
| EP | 1 089 452 | 4/2001 |
| EP | 1089452 A1 | 4/2001 |
| WO | WO 03/001699 | 1/2003 |

OTHER PUBLICATIONS

Harris, F. Multirate Signal Processing for Communication Systems. May 14, 2004. Prentice Hall. p. 400-407.

Fliege, N. Multiraten-signalverarbeitung. 1993. Germany. p. 256-258.

* cited by examiner

| NAME | ALPHA α | BETA β | Avg Err (linear) | RMS (dB) | Peak (dB) |
|---|---|---|---|---|---|
| Min RMS Err | 0,947543636291 | 0,392485425092 | 0,000547 | -32,6 | -25,6 |
| Min Peak Err | 0,960433870103 | 0,397824734759 | -0,013049 | -31,4 | -28,1 |
| Min RMS w/ Avg=0 | 0,948059448969 | 0,392699081699 | 0,000003 | -32,6 | -25,7 |
| 1, Min RMS Err | 1 | 0,32326099 | -0,020865 | -28,7 | -23,8 |
| 1, Min Peak Err | 1 | 0,335982538 | -0,025609 | -28,3 | -25,1 |
| 1, 1/2 | 1 | 0,5 | -0,086775 | -20,7 | -18,6 |
| 1, 1/4 | 1 | 0,25 | 0,006456 | -27,6 | -18,7 |
| Frerking | 1 | 0,4 | -0,049482 | -25,1 | -22,3 |
| 1, 11/32 | 1 | 0,34375 | -0,028505 | -28,0 | -24,8 |
| 1, 3/8 | 1 | 0,375 | -0,040159 | -26,4 | -23,4 |
| 15/16, 15/32 | 0,9375 | 0,46875 | -0,018851 | -29,2 | -24,1 |
| 15/16, 1/2 | 0,9375 | 0,5 | -0,030505 | -26,9 | -24,1 |
| 31/32, 11/32 | 0,96875 | 0,34375 | -0,000371 | -31,6 | -22,9 |
| 31/32, 3/8 | 0,96875 | 0,375 | -0,012024 | -31,4 | -26,1 |
| 61/64, 3/8 | 0,953125 | 0,375 | 0,002043 | -32,5 | -24,3 |
| 61/64, 13/32 | 0,953125 | 0,40625 | -0,009611 | -31,8 | -26,6 |

FIGURE 9

| Name | Type | Owner | Date |
|---|---|---|---|
| a_corrburst | Var | wgc | 12 Dec. 03 |
| Description | | | |
| Correlation signal | | | |

FIGURE 15a

| Name | Type | Owner | Date |
|---|---|---|---|
| a_corrburstlen | Var | wgc | 12 Dec. 03 |
| Description | | | |
| Length of the correlation signal in symbols (complex) | | | |

FIGURE 15b

| Name | Type | Owner | Date |
|---|---|---|---|
| comrotterm | Trans | koe | 15 Oct. 03 |

| Description |
|---|
| Estimated rotation term for compensating for a frequency offset with the partial correlations |

| Representation |
|---|
| Complex-valued |

| Comment |
|---|
| Complex-valued, so that magnitude has been normalized to 1 |

FIGURE 15c

| Name | Type | Owner | Date |
|---|---|---|---|
| corrvals | Trans | koe | 15 Oct. 03 |

| Description |
|---|
| Complex correlation values calculated in the FPGA |

| Representation |
|---|
| Vector of complex values |

FIGURE 15d

| Name | Type | Owner | Date |
|---|---|---|---|
| maxind0 | Trans | koe | 15 Oct. 03 |
| Description ||||
| Index (counted from 0) of the correlation value corrvals with maximum magnitude ||||
| Representation ||||
| Integer ||||

FIGURE 15e

| Name | Type | Owner | Date |
|---|---|---|---|
| recenerg | Trans | koe | 15 Oct. 03 |
| Description ||||
| Energy of the receive signal (sum of I and Q components) calculated over the estimated location of the T burst within the window ||||
| Representation ||||
| integer ||||

FIGURE 15f

| Name | Type | Owner | Date |
|---|---|---|---|
| t_nocorrvals | Const | koe | 27 Oct. 03 |
| Description | | | |
| Number of tracking (partial) correlation values | | | |

FIGURE 15g

| Name | Type | Owner | Date |
|---|---|---|---|
| t_nopartcorrs | Const | koe | 30 Oct. 03 |
| Description | | | |
| Number of tracking partial correlations for combating the frequency offset | | | |
| Comment | | | |
| - must always be EVEN<br>- is the same for all transmitters | | | |

FIGURE 15h

| Name | Type | Owner | Date |
|---|---|---|---|
| t_paddcorrseqlen | Const | koe | 30 Oct. 03 |
| Description | | | |
| Overall length of the (possibly zero-padded) tracking partial correlation sequences | | | |

FIGURE 15i

| Name | Type | Owner | Date |
|---|---|---|---|
| t_partcorrseqlen | Const | koe | 30 Oct. 03 |
| Description | | | |
| Length of each tracking partial correlation sequence | | | |
| Comment | | | |
| t_partcorrseqlen = t_paddcorrseqlen / t_nopartcorrs | | | |

FIGURE 15j

| Name | Type | Owner | Date |
|---|---|---|---|
| t0_partcorrseqs | Var | koe | 30 Oct. 03 |
| Description | | | |
| Tracking partial correlation sequences for T burst 0 of the transmitter considered | | | |
| Comment | | | |
| - t_nopartcorrs (complex-valued) sequences of the length t_partcorrseqlen<br>- I and Q components each exist with a value range of -1 to +1 | | | |

FIGURE 15k

| Name | Type | Owner | Date |
|---|---|---|---|
| t1_partcorrseqs | Var | koe | 30 Oct. 03 |
| Description | | | |
| Tracking partial correlation sequences for T burst 1 of the transmitter considered | | | |
| Comment | | | |
| - in a linear measure, i.e. $10^{-1.2}$ corresponds to SNIR=−12dB<br>- may be different for each transmitter (but always the same value for the two T bursts of a transmitter) | | | |

FIGURE 15l

| Name | Type | Owner | Date |
|---|---|---|---|
| transmitbit | Trans | koe | 15 Oct. 03 |
| Description ||||
| Estimated transmitted channel bit ||||
| Representation ||||
| integer ||||

FIGURE 15m

| Name | Type | Owner | Date |
|---|---|---|---|
| toa | Trans | hfn | 15 Oct. 03 |
| Description ||||
| Estimated TOA of the T-burst start ||||
| Representation ||||
| Integer ||||
| Comment ||||
| in ps since system start; only for calculation of position ||||

FIGURE 15n

| Name | Type | Owner | Date |
|---|---|---|---|
| winstartpos | Trans | koe | 15 Oct. 03 |
| Description ||||
| Timestamp of the start of the window in which the correlation values have been calculated ||||
| Representation ||||
| Integer ||||
| Comment ||||
| this timestamp belongs to the corrvals correlation value with the index of 0 ||||

FIGURE 15o

| Name | Type | Owner | Date |
|---|---|---|---|
| a_nopartcorrs | Const | wgc | 14 Oct. 03 |
| Description ||||
| Number of partial correlations in the receiver algorithm of the acquisition burst ||||

FIGURE 15p

DEVICE AND METHOD FOR DETERMINING A CORRELATION VALUE

BACKGROUND OF THE INVENTION

1. Field of the Invention

The present invention relates to devices and methods for determining a correlation value, which are useable, in particular, for digital transmission systems.

2. Description of Prior Art

For a receiver in a digital transmission system to be able to synchronize to a digital signal sent out by a transmitter, the transmitter radiates a digital signal known to the receiver. The receiver's task is to determine the precise time of arrival (TOA) of the signal sent. To determine the time of arrival, the cross-correlation between the digital receive signal and the known digital transmit signal is calculated. Subsequently, the magnitude maximum of the cross-correlation is detected, and the time of arrival of the transmit signal is determined from the position of the correlation magnitude maximum.

The existence of a carrier-frequency offset between a transmitter and a receiver may lead to a "self-extinction" of the cross-correlation from a certain length of the transmit signal, i.e. the individual addends in the cross-correlation add up to zero due to a complex rotation term caused by the carrier-frequency offset.

In the following example, a perfect transmission with the exception of a carrier-frequency offset between a transmitter and a receiver and with a constant channel coefficient a and a delay L shall be assumed. If a T burst x[k], to be transmitted, of a length t_burstlen, abbreviated by the variable K in the following, is stored in the transmitter, the receiver receives the complex baseband signal $$y[k+L] = \alpha \cdot x[k] \cdot e^{j(2\pi \Delta F k + \phi_0)},$$

wherein $\Delta F = \text{maxfreqoffsppm} \cdot 10^{-6} \cdot \text{carfreq}/B\_clock$ is the frequency offset normalized to a B_sample clock. That is, per B_sample, the phase difference between x[k] and y[k] increases by $2\pi\Delta F$ radiant. This receive signal y[k] now is to be correlated with the original signal x[k] stored in the transmitter and receiver.

With maxfreqoffsppm=30, carfreq=2.445 GHz and B_clock=101.875 MHz, for example the phase per B_sample changes by 0.0045 radiant, or 0.00072, respectively, from the full circle. Thus, the phase difference cycles the full circle once between x[k] and y[k] within 1,389 samples.

The cross-correlation between the receive signal y[k] and the correlation sequence x[k] is now defined as $$r_{yx}[l] = \sum_{k=0}^{K-1} y[k+l] \cdot x^*[k].$$

The index l here indicates by how much y[k] is to be shifted in the correlation calculation. In the receiver, we are interested in the t_nocorrvals correlation values for indices l=0, ..., t_nocorrvals−1.

When y[k] thus shifted is shifted by L B_samples, so that y[k+L] and x[k] match in an optimum manner, we obtain $$r_{yx}[L] = \sum_{k=0}^{K-1} \alpha \cdot |x[k]|^2 e^{j(2\pi \Delta F k + \phi_0)}$$

as a correlation value.

Let us assume that $|x[k]|^2$ is constantly=C and that the entire T burst has a length of exactly K=1,389 B_samples, then the above correlation calculation corresponds to a summation over a complex-valued pointer of a constant length which rotates by exactly one full circle in the course of the 1,389 B_samples. The rotation of the pointer is shown in FIG. 16, the figure representing the plane of complex numbers.

It may be seen that the summation for the correlation value in this example results in $r_{yx}[L]=0$ even though x[k] and y[k+L] are an optimum match. With this carrier-frequency offset and this T-burst length, the determination of the length offset of the T burst x[k] within the receive signal y[k] with the help of the correlation sequence x[k] fails. As a result of an extinction of the correlation value due to a carrier-frequency offset, it is not possible, for example, to determine the correlation magnitude maximum. As a consequence thereof, a synchronization between the transmitter and the receiver of a transmission system is made more difficult, or data transmission may be flawed.

SUMMARY OF THE INVENTION

It is the object of the present invention to provide a device and a method which enable reliable determination of a correlation value.

In accordance with a first aspect, the invention provides a device for determining a correlation value from a correlation between a first sequence of values with complex values and a second sequence of values with complex values, the device having:

a correlator configured to determine a first partial correlation value from a correlation between a first subset of the first sequence of values and a first subset of the second sequence of values, and a second partial correlation value from a correlation between a second subset of the first sequence of values and a second subset of the second sequence of values;

a processor configured to determine a processed partial correlation value with an adjusted phase term from the first partial correlation value or the second partial correlation value; and a calculator configured to determine the correlation value using the processed partial correlation value.

In accordance with a second aspect, the invention provides a method for determining a correlation value from a correlation between a first sequence of values with complex values and a second sequence of values with complex values, the method including the steps of:

determining a first partial correlation value from a correlation between a first subset of the first sequence of values and a first subset of the second sequence of values, and determining a second partial correlation value from a correlation between a second subset of the first sequence of values and a second subset of the second sequence of values;

determining a processed partial correlation value with an adjusted phase term from the first partial correlation value or the second partial correlation value; and determining the correlation value using the processed partial correlation value.

In accordance with a third aspect, the invention provides a computer program with a program code for performing the method for determining a correlation value from a correlation between a first sequence of values with complex values and a second sequence of values with complex values, the method including the steps of:

determining a first partial correlation value from a correlation between a first subset of the first sequence of values and a first subset of the second sequence of values, and determining a second partial correlation value from a correlation between a second subset of the first sequence of values and a second subset of the second sequence of values;

determining a processed partial correlation value with an adjusted phase term from the first partial correlation value or the second partial correlation value; and determining the correlation value using the processed partial correlation value, when the computer program runs on a computer.

The present invention is based on the findings that it is advantageous to calculate a cross-correlation by means of partial correlations. To this end, the cross-correlation is chopped into pieces which correspond to the partial correlations. The correlation value is determined by linking the partial correlation values. The correlation sequences may comprise complex values, so that the partial correlation values may also be complex-valued and thus comprise a phase term in the plane of complex numbers. For example due to a frequency offset of the sequences of values, the phase terms may be different. To link the individual partial correlation values, the processed partial correlation values have an adjusted phase term, that is the phase term of the partial correlation values has been changed such that the processed partial correlation values are overlapped in the plane of complex numbers.

If the inventive device is employed in a transmission system, and if the sequences of values are a receive signal and a transmit signal present in the receiver, the calculation of the correlation value takes places for each shift between the receive signal and the transmit signal present in the receiver, respectively.

The inventive approach is advantageous, since within the short partial correlations, the destructive effect of a self-extinction of the cross-correlation does not occur. Thus, the inventive approach enables reliable determination of a correlation value even if there is a frequency offset between the correlation sequences. A further advantage is that the calculation of the partial correlation values may be performed in parallel.

In accordance with one embodiment, the phase terms of the individual partial correlation values are eliminated, and the processed partial correlation values resulting therefrom are summed up. The elimination of the phase terms may be effected by means of forming a magnitude.

The elimination of the phase terms is advantageous, since a corresponding implementation is simple to realize due to the low computing expenditure. Thereby, the correlation value may be determined fast.

In accordance with a further embodiment, a processed partial correlation value is formed from respectively adjacent partial correlation values, the processed partial correlation values comprising an adjusted phase term corresponding to the phase difference of adjacent partial correlation values. The processed partial correlation values are summed up to determine the correlation value. Determining the phase difference may be effected by means of complex-conjugated multiplication of adjacent partial correlation values.

Taking into account the phase position of the partial correlation values is advantageous, since the correlation value can still be reliably determined even with a high frequency offset between the sequences of values.

In accordance with a further embodiment, the phase difference between adjacent partial correlation values is determined, and the phase term of the individual partial correlation values is reduced or increased, respectively, by so much that the phase terms of the processed partial correlation values are adjusted to a selected partial correlation value, for example to the first partial correlation value. Thus, all partial correlation values are rotated forward or backward, respectively, in the plane of complex numbers until they overlap with the first partial correlation value. The correlation value is determined by linking the overlapped processed partial correlation values with the first partial correlation value.

The embodiment is based on the findings that the phase change between two successive partial correlation values is approximately constant. Once the rotation term which corresponds to the phase change has been determined, the complex partial correlation values may be added up in a coherent manner. Since the magnitude of the rotation terms takes into account the size and thus the reliability of the partial correlation values, the rotation terms involved may be weighted with their reliability.

The coherent addition of the partial correlation values may be performed by means of two separate additions, wherein half of the partial correlation values, respectively, are added up. An advantage of such an implementation is that a cascading in accordance with the Horner scheme may be used, by means of which the delay time in the addition is reduced. A further advantage is that a possible phase error occurring in calculating the correlation value may be kept small. This is important, since, as a rule, the phase cannot be estimated in an error-free manner in the rotation term. In correspondence with the phase, an error in the normalization of the rotation term which occurs when calculating the cross-correlation sequence may be reduced in that the addition is performed by means of two separate summations.

The inventive combination of partial correlations for calculating the correlation value is robust against frequency offset, the frequency offset having to be estimated neither explicitly nor implicitly.

BRIEF DESCRIPTION OF THE DRAWINGS

Preferred embodiments of the present invention will be explained below in more detail with reference to the accompanying figures, wherein:

FIG. 9 shows a table with values for a magnitude estimation in accordance with an embodiment of the present invention;

FIGS. 15a to 15p are overviews of the parameters used; and

DESCRIPTION OF PREFERRED EMBODIMENTS

Figure 1:
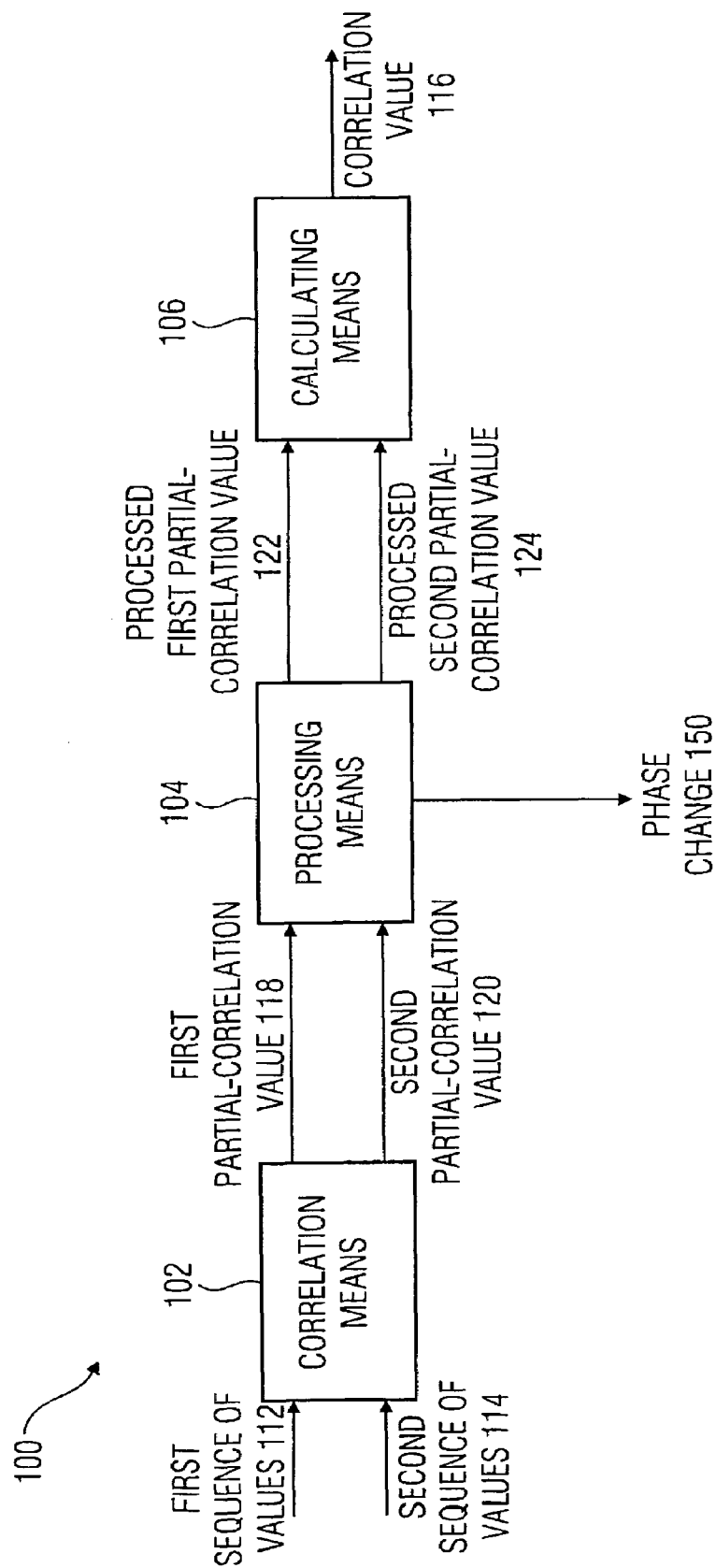
FIG. 1 is a block diagram of a device for determining a correlation value in accordance with an embodiment of the present invention.

In the following description of the preferred embodiments of the present invention, identical or similar reference numerals will be used for those elements which are depicted in the various drawings and have similar actions, a repeated description of these elements being dispensed with.

FIG. 1 shows a diagrammatic representation of a device for determining a correlation value from a correlation between a first sequence of values and a second sequence of values in accordance with an embodiment of the present invention. Device 100 for determining a correlation value comprises a correlation means 102, a processing means 104 and a calculating means 106. Device 100 is configured to determine a correlation value 116 from a first sequence of values 112 and a second sequence of values 114.

Correlation means 102 is configured to receive the first sequence of values 112 and the second sequence of values 114. Alternatively, the second sequence of values 114 may be stored in the correlation means. The first sequence of values 112 and the second sequence of values 114 may comprise complex values. Correlation means 102 is configured to determine a first partial correlation value 118 from a correlation between a first subset of the first sequence of values and a first subset of the second sequence of values. In addition, correlation means 102 is configured to determine a second partial correlation value 120 from a second subset of the first sequence of values 112 and a second subset of the second sequence of values 114. The subsets of the first sequence of values 112 and of the second sequence of values 114 correspond. That is, the subsets are determined from the sequences of values 112, 114 in accordance with a common subdivision specification. In accordance with this embodiment, the subsets do not overlap and match with the entire value ranges of the sequences of values 112, 114. If the sequences of values 112, 114 each consist of 100 values, for example, the first subset may consist, for example, of the first 50 values of the first sequence of values 112 and of the second sequence of values 114, respectively, and the second subset may consist of the second 50 values of the sequences of values 112, 114, respectively. If the sequences of values 112, 114 are subdivided into further subsequences, the correlation means 102 is configured to determine further partial correlation values from the respective further subsets of the sequences of values 112, 114.

The partial correlation values 118, 120 are determined in the correlation means 102 by correlating the respective subsets of the sequences of values 112, 114 with each other. The correlation may be a cross-correlation or an auto-correlation.

Since the sequences of values 112, 114 comprise complex values, the partial correlation values 118, 120 may also be complex-valued, i.e. they comprise a phase term. Correlation means 102 provides the partial correlation values 118, 120 to processing means 104.

Processing means 104 is configured to receive the first partial correlation value 118 and the second partial correlation value 120. If correlation means 102 provides further partial correlation values, processing means 104 is configured to likewise receive the further partial correlation values. Processing means 104 is configured to determine a processed partial correlation value 122 with an adjusted phase term from the first partial correlation value 118 and the second partial correlation value 120. Alternatively, processing means 104 may be configured to determine the processed first partial correlation value 122 and a processed second partial correlation value 124 from the first partial correlation value 118 and the partial correlation value 120. The processed partial correlation values 122, 124 have an adjusted phase term. If an adjustment of the phase term of a partial correlation value 118, 120 is not necessary, the phase term of the processed partial correlation values 122, 124 may correspond to the respective phase term of the partial correlation values 118, 120. Processing means 104 is configured to provide the processed first and second partial correlation values 122, 124.

Calculating means 106 is configured to receive the processed first and second partial correlation values 122, 124. If processing means 104 provides further processed partial correlation values, calculating means 106 is configured to likewise receive these further processed partial correlation values. Calculating means 106 is configured to provide the correlation value 116 from the processed partial correlation values 122, 124. If only one processed partial correlation value 122 is provided to calculating means 106, calculating means 106 is configured to determine the correlation value 116 from the one processed partial correlation value 122. If a plurality of processed partial correlation values 122, 124 are provided to calculating means 106, calculating means 106 is configured to link the processed partial correlation values 122, 124 with each other and to provide the linking result as the correlation value 116.

In accordance with this embodiment, device 100 is part of a receiver (not shown in FIG. 1) of a digital transmission system. The first sequence of values 112 is a part of a receive sequence received by the receiver. For example, the first sequence of values 112 may be a digital burst used for synchronizing the receiver to a transmitter (not shown in FIG. 1). The second sequence of values 114 corresponds to the original first sequence of values 112 as was originally sent out by the transmitter. To determine the time of arrival of the first sequence of values 112, the second sequence of values 114, which corresponds to the first sequence of values 112, is known in the receiver. For example, the second sequence of values 114 may be stored in the receiver and/or in the device 100 or, alternatively, may be received by the latter. Alternatively, the first sequence of values 112 may be part of a continuous sequence of values. In this case, the first sequence of values 112 in the device 100 may continuously be subdivided into subsets which correspond to the subsets of the second sequence of values 114.

In accordance with a further embodiment, device 100 is configured to determine a frequency offset between the first and second sequences of values 112, 114 and to provide same as a phase change 150. The phase change 150 may be determined, in the processing means 104, from a comparison or a linkage of the partial correlation values 118, 120.

Correlation means 102 may comprise one single or a plurality of correlation means. If the correlation means 102 comprises only one single correlation means, the subsets of the sequences of values 112, 114 are calculated one after the other in the correlation means 102. If the correlation means 102 comprises a plurality of partial correlation means, the partial correlation values 118, 120 may be determined in parallel. The processed partial correlation values 122, 124 may be linked in calculating means 106 by adding or overlapping the processed partial correlation values 122, 124.

In accordance with an embodiment of the present invention, in device 100, a summation is performed in sections for a number of t_nopartcorrs, abbreviated by the variable N in the following, partial correlation sequences of the length of t_partcorrseqlen, abbreviated by variable M in the following. The partial correlation sequences correspond to subsets of the sequences of values 112, 114. If the burst length, i.e. the length of the second sequence of values 114, is referred to as K, the following applies for calculating the correlation value 116:

$$r_{yx,n}[l] = \sum_{k=n \cdot M}^{(n+1) \cdot M - 1} y[k+l] \cdot x^*[k]$$

for n=0 . . . N−1, wherein N*M≧K must apply. x[k] corresponds to the second sequence of values 114, and y[k+L] corresponds to the first sequence of values 112. A prolongation of x[k] from the original length K to N*M is effected by filling up with zeros at one or both ends, which is the so called zero padding. The overall length N*M of the zero-padded correlation sequence x[k] is referred to as t_paddcorrseqlen, wherein t_paddcorrseqlen>K.

In this embodiment, two T bursts are provided as sequences of values. In zero-padding the T burst X, X having a value of 0 or 1, of the length tX_burstlen to the correlation sequence of the length t_paddcorrseqlen, tX_frontpaddlength=ceil((t_paddcorrseqlen−tX_burstlen)/2)

zeros are filled up before the start of the T burst, and the remainder of zeros, i.e.

floor((t_paddcorrseqlen−tX_burstlen)/2), are filled up at its end.

Since eventually t_nocorrvals correlation values are required for a correlation sequence length t_paddcorrseqlen, a receive signal window of the length of t_paddcorrseqlen+ t_nocorrvals−1 B_samples is considered in total. The values occurring in the receive signal window correspond to the first sequence of values 112.

The zero-padded correlation sequence for the T burst X is available to the receiver already in the form of t_nopartcorrs complex-valued partial correlation sequences tx_partcorrseqs for X=0 or 1, of the length t_parcorrseqlen, respectively, which may immediately be used in the above summation.

Figure 2:
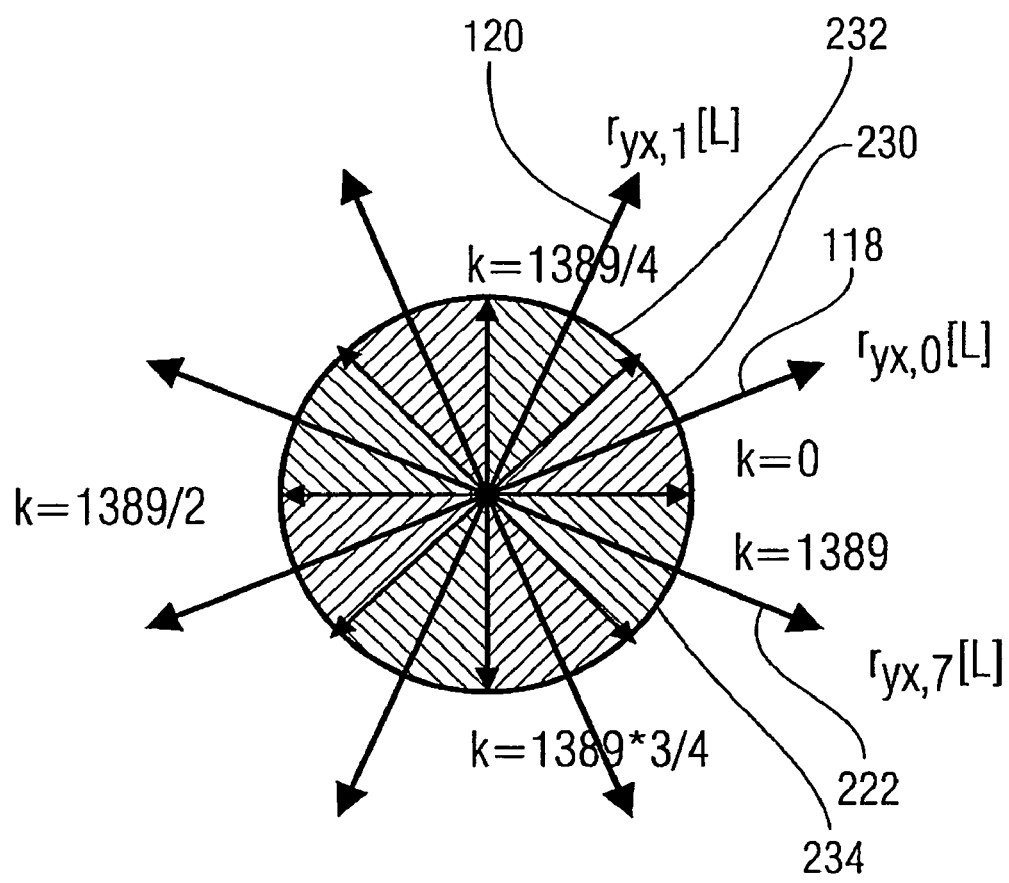
FIG. 2 is a graphic representation of partial correlation values in accordance with the present invention.

FIG. 2 is a graphic representation of the plane of complex numbers for illustrating the principle of partial correlations. In the following embodiment, N=8 and M=174. As a result, N*M=1,392>K=1,389, i.e. three zeros must be filled up. The thin short arrows in FIG. 2 represent the phase difference between x[k] and y[k+L], which keeps rotating with the index k. The hatchings indicate the indices over which the eight partial correlations are calculated. The fat long arrows represent the results of the partial correlations. For illustration purposes, some such segments as well as the eight results of the partial correlations are marked by reference numerals. The first partial correlation value $r_{yx,0}[L]$ is referred to as reference numeral 118, and the second partial correlation value $r_{yx,1}[L]$ is referred to as reference numeral 120. A further partial correlation value, in this case the eighth partial correlation value $r_{yx,7}[L]$, is indicated by reference numeral 222. The first partial correlation value 118 is a result of a correlation over a first subset 230 ranging from the value k=0 to the value k=1,389/8 of the sequence of values. The second partial correlation value 120 has been determined over a subsequent subset 232. The eighth partial correlation value 222 is calculated by correlating over a further subset 234, in this case the eighth subset of the sequence of values It can be seen from FIG. 2 that the partial correlations $r_{yx,n}[L]$ do not disappear while the entire correlation $r_{yx}[L]$ i.e. the correlation over the entire sequence of values of k=0 to k=1,389 is zero. In each of the partial correlations $r_{yx,n}[L]$, a corruption due to the phase difference, which continues to rotate, between the sequences of values x[k] and y[k+L] is small, since the phase difference only changes by pi/4. This is based on the example described in the introduction to the description.

It also can be seen from FIG. 2 that a total of eight complex partial correlation values $r_{yx,n}[L]$ are calculated, which now still need to be linked to form one single correlation value. The partial correlation values may be linked in various ways.

In accordance with an embodiment, correlation means 116 comprises partial correlators, the samples of which are read into the processing means in parallel. The complex inputs of the processing means will be referred to as Input 1, Input 2, . . . , Input 16 in the following, and the real output for the correlation value will be referred to as Output. The real correlation signal, or the real correlation value, for which a maximum may subsequently be determined, is calculated from the complex samples of the 16 partial correlations.

In accordance with this embodiment, the generation of the real correlation signal consists in that the absolute values of all 16 partial correlation samples are formed and summed up. That is, the correlation value Output is Output=*abs*(Input1)+*abs*(Input2)+ . . . +*abs*(Input16).

An advantage of summing up the absolute values is the simplicity of the implementation, since only low computing expenditure is required for forming the absolute values. However, with a frequency offset occurring, a decision threshold as to whether there is a maximum must be selected to be very small if the bursts are to be detected in such a case as well. This results from the fact that the mutual relative phase positions of the samples to be added are not taken into account, which leads to a reduction of the correlation gain.

Figure 3:
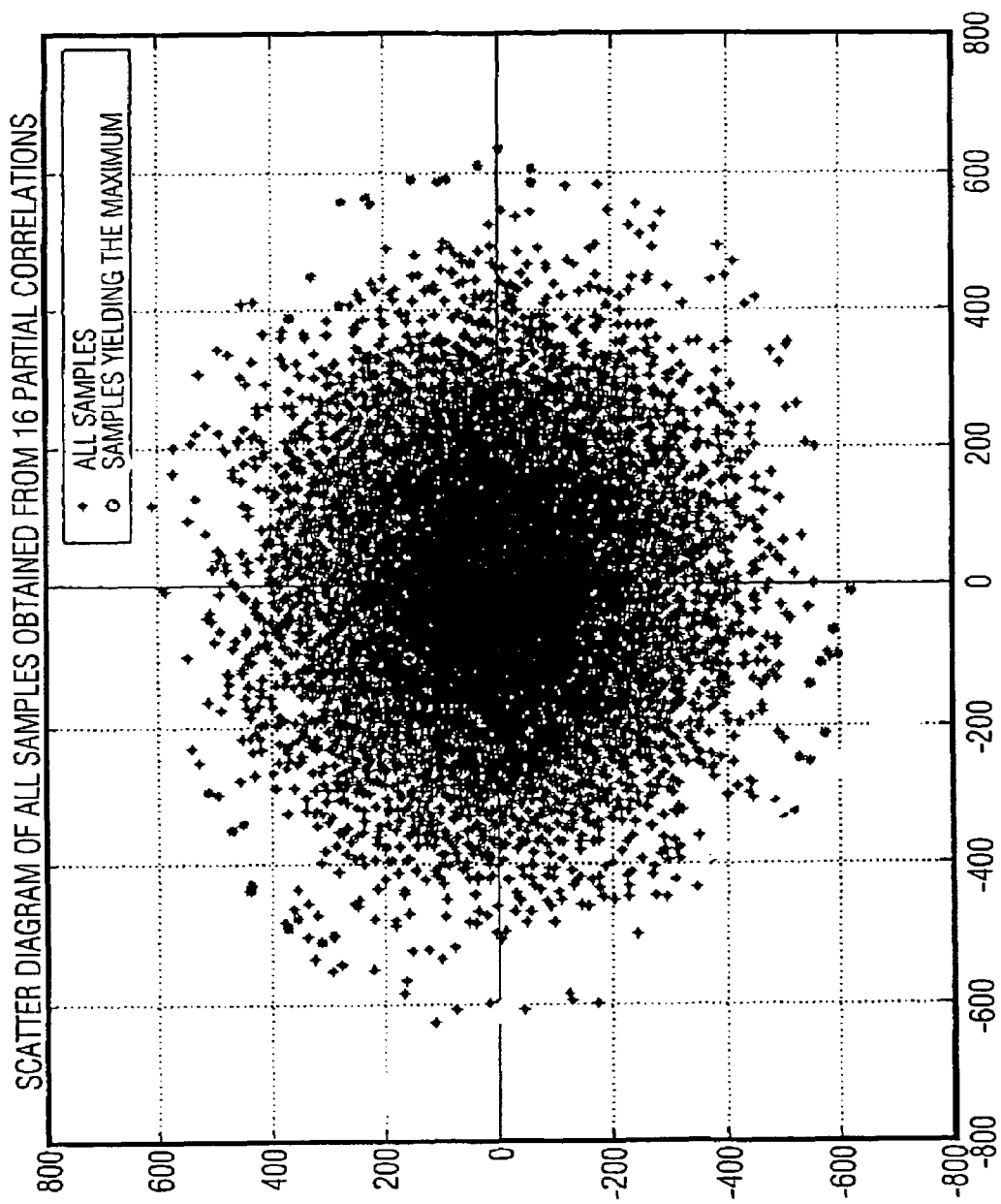
FIG. 3 is a scatter diagram of partial correlation samples in accordance with an embodiment of the present invention.

As an example of this, a scatter diagram is depicted in FIG. 3, the samples of which have been obtained from the 16 partial correlations at a relative frequency offset of 30 ppm and without noise. The points marked are the points which, in FIG. 4, yield the peak in the correlation signal after the formation of the absolute values and the summation of all 16 partial correlation results.

Figure 4:
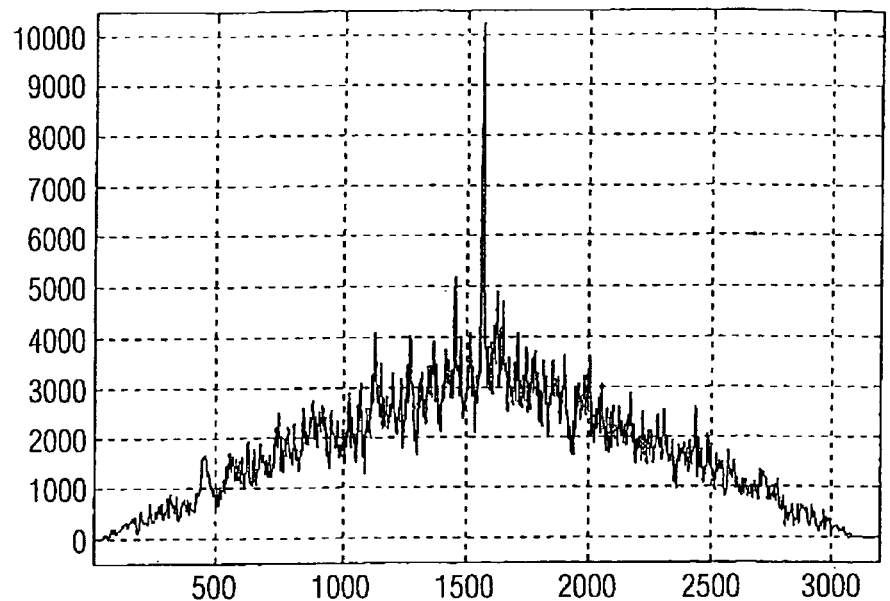
FIG. 4 is a graphic representation of a correlation curve in accordance with an embodiment of the present invention.

FIG. 4 shows a graphic representation of a correlation curve, the partial correlation values having been joined by summing the absolute values of the partial correlations. The correlation curve represents a combination of the first sequence of values with the second sequence of values. The correlation values determined in the device for determining a correlation value are plotted along the horizontal axis in FIG. 4. The vertical axis represents the magnitudes of the individual correlation values. It can be seen from FIG. 4 that a peak which corresponds to a correlation magnitude maximum exists approximately in the center of the correlation signal.

Figure 5:
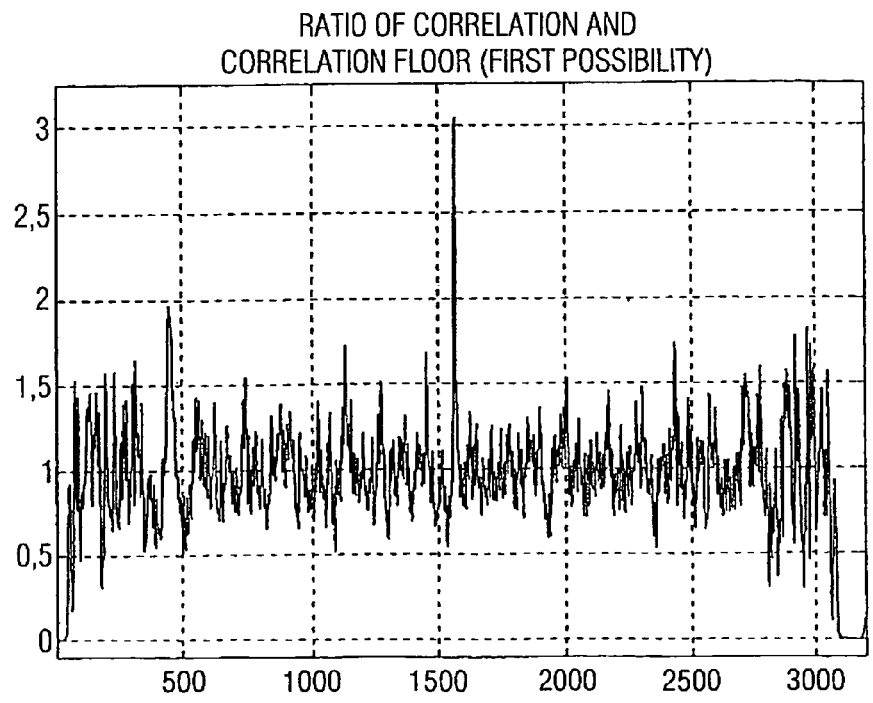
FIG. 5 is a graphic representation of the ratio between correlation and correlation floor in the correlation curve shown in FIG. 4.

FIG. 5 is a graphic representation of the ratio between correlation and correlation floor of the correlation signal shown in FIG. 4. The ratio between correlation and correlation floor reveals that the peak depicted in FIG. 4 stands out from the floor only by three times the magnitude even in the event of there not being any noise.

In accordance with a further embodiment of a device for determining a correlation value, the mutual relative phase positions of the partial correlation samples, which are 16 in this embodiment, are included in calculating the correlation signal due to the frequency offset occurring between the first and second sequences of values. Including the phase position between the individual partial correlation values has the advantage that, if a frequency offset occurs, the decision threshold of a subsequent decision as to whether a correlation value represents a maximum may be selected to be high so that a reliable detection of a burst is still possible even with a noisy signal.

In accordance with this embodiment, respectively two successive input samples, or partial-correlation values, Input (i) and Input (i+1) are subject to complex-conjugated multiplication, whereby a phase difference between the two samples is indirectly calculated. If the first partial correlation value is referred to as $z_1 = r_1 * \exp(j * \phi_1)$, and the second partial correlation value is referred to as $z_2 = r_2 * \exp(j * \phi_2)$, the complex-conjugated multiplication of the first partial correlation value by the second partial correlation value results in $z_1 * z_2 = r_1 * r_2 * \exp(j * (\phi_1 - \phi_2))$. Here, $r_1$, $r_2$ indicates the amplitude of the partial correlation values, and $\phi_1 - \phi_2$ indicates the phase of the partial correlation values.

The results of the 15 complex-conjugated multiplications are summed up, and the absolute value of this sum is formed. For the Output corresponding to the correlation value, the following thus results:

$$\text{Output} = \text{abs}(\text{Input1} * \text{conj}(\text{Input2}) + \text{Input2} * \text{conj}(\text{Input3}) + \ldots + \text{Input15} * \text{conj}(\text{Input16})).$$

Figure 6:
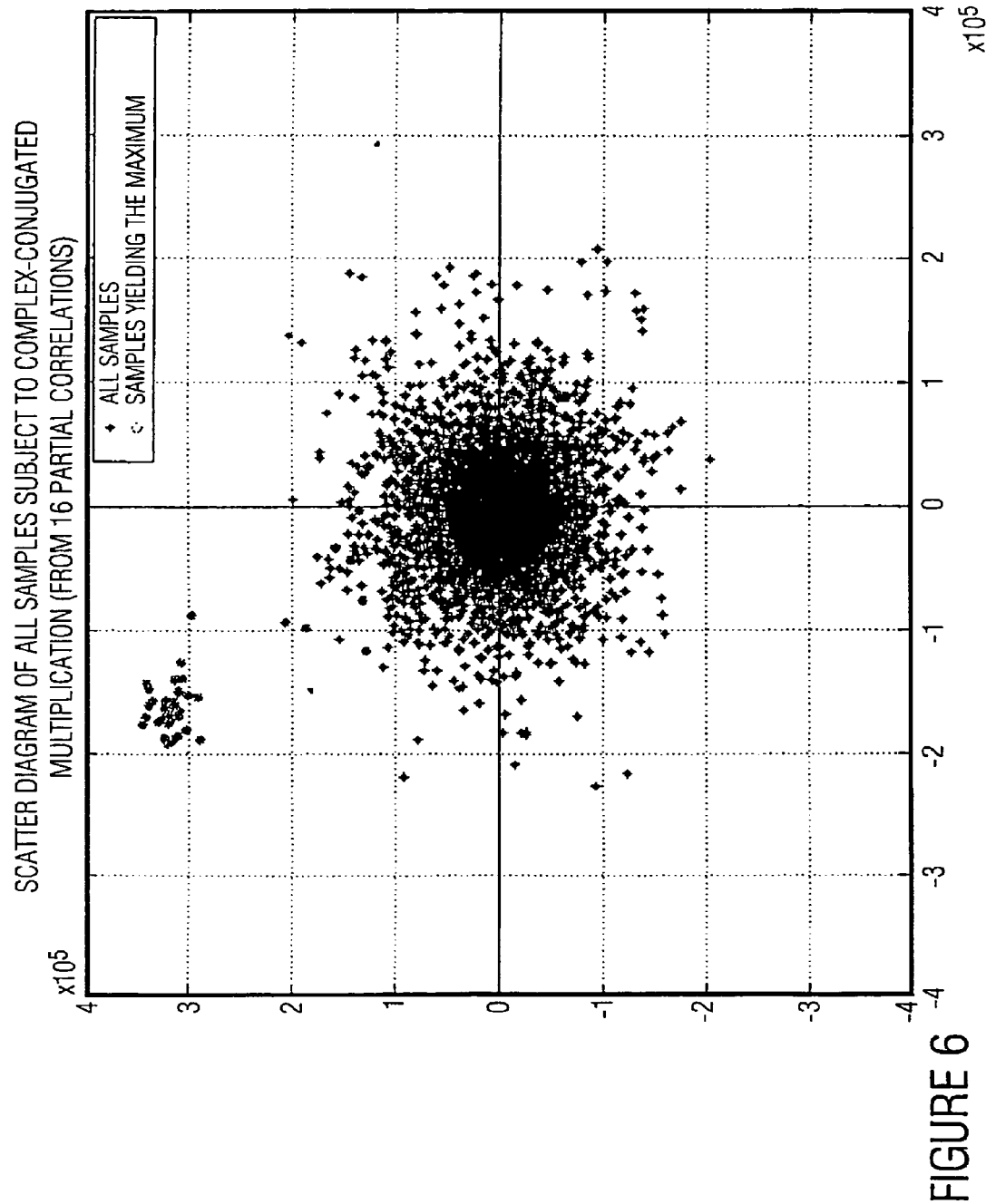
FIG. 6 is a scatter diagram of the partial correlation samples in accordance with a further embodiment of the present invention.
Figure 16:
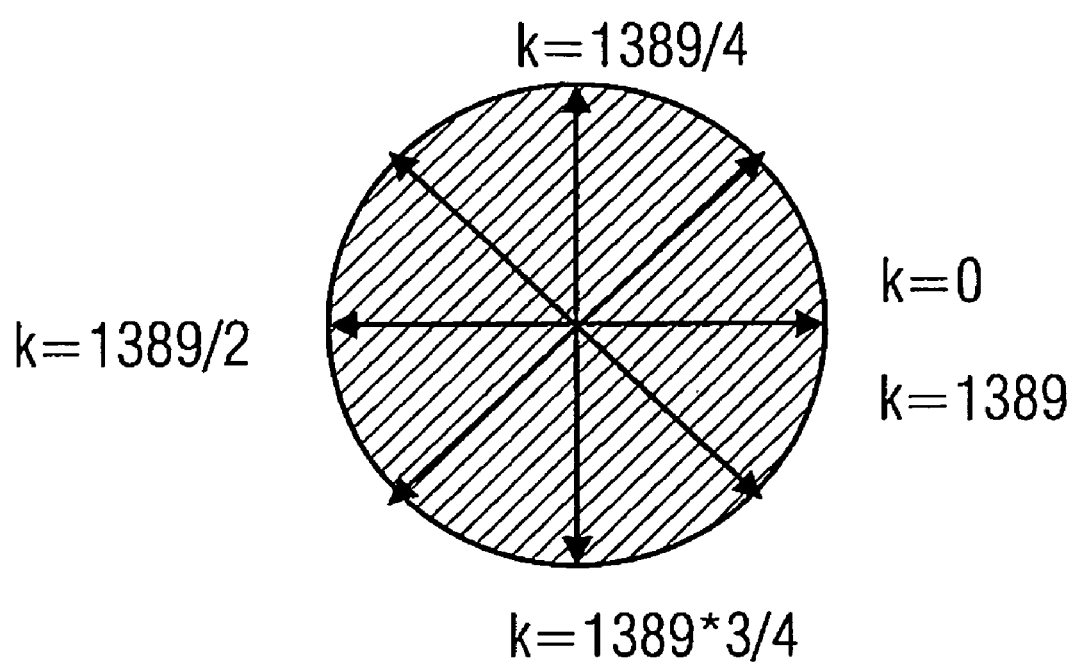
FIG. 16 is a graphic representation of a correlation-value calculation in accordance with the prior art.

FIG. 16 shows a scatter diagram of all samples, which have been subject to complex-conjugated multiplication, whereby a phase difference between the two, in accordance with this embodiment, of the 16 partial correlators. For the scatter diagram shown in FIG. 6, the samples of the 16 partial correlations of FIG. 3 have been subject to complex-conjugated multiplication. Unlike FIG. 3, the marked points forming the maximum of the correlation signal may be differentiated from the remaining samples.

Figure 7:
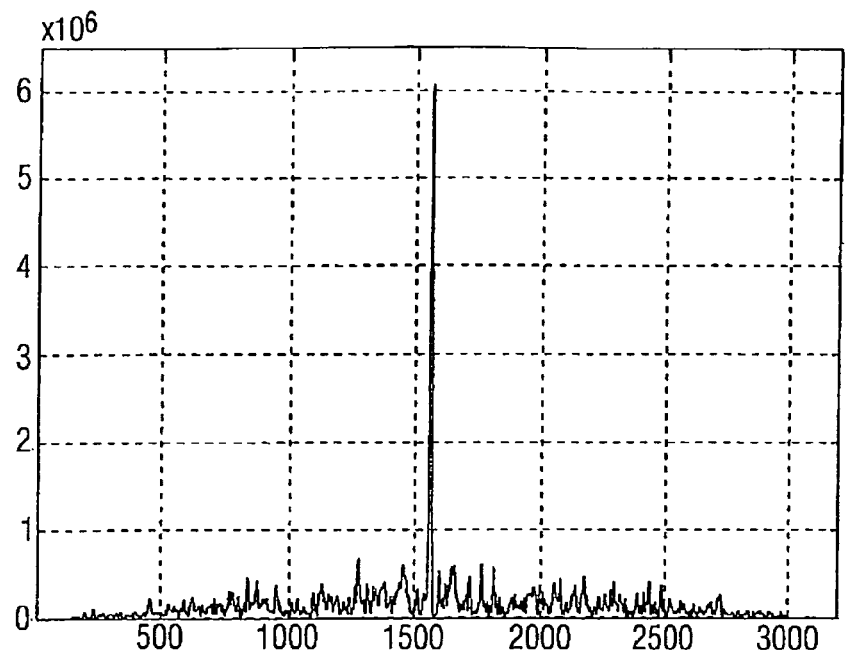
FIG. 7 is a graphic representation of a correlation curve in accordance with a further embodiment of the present invention.

FIG. 7 shows the result of the correlation in accordance with this embodiment, the partial correlation results having been joined, in accordance with this embodiment, while taking into account the phase position between the partial correlation samples. The correlation signal shown in FIG. 7 thus corresponds to the correlation signal shown in FIG. 4, the correlation signal shown in FIG. 4 having been summed up by summing the absolute values of the partial correlations without taking into account the phase position between the individual partial correlation samples. For the correlation signal shown in FIG. 7, the phase terms have been taken into account.

Figure 8:
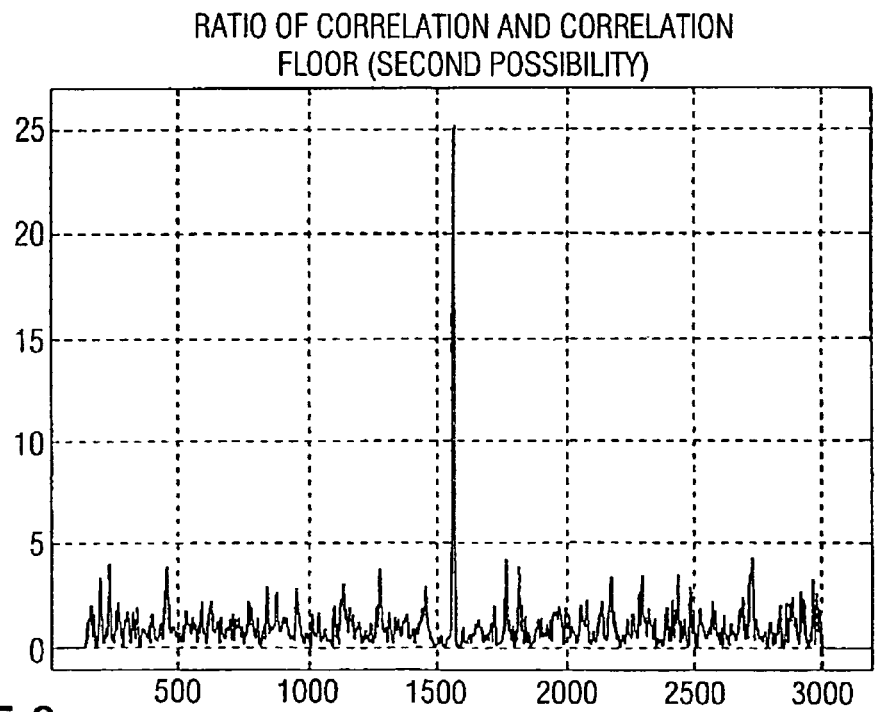
FIG. 8 is a graphic representation of the ratio between correlation and correlation floor in accordance with the correlation curve shown in FIG. 7.

FIG. 8 shows the ratio between correlation and correlation floor for the correlation signal shown in FIG. 7. While in the preceding embodiment of the summation of the absolute values, the maximum stands out from the correlation floor only by three times the magnitude in the noiseless case and with a relative frequency offset of the 30 ppm, the peak exceeds the floor by 25 times the magnitude in accordance with this embodiment. The detection of a maximum therefore is very clear with the method in accordance with this embodiment.

By adding the complex-valued results of the complex-conjugated multiplications, a complex-valued correlation value is calculated, the absolute value of which is subsequently determined. For implementation reasons, the calculation of the absolute value may involve dispensing with forming the root, or may involve adding only the magnitudes of the real and imaginary parts, i.e. $a^2 + b^2$ or $|a| + |b|$ may be used instead of $|z| = \sqrt{a^2 + b^2}$, while $z = a + j * b$ applies.

Another possibility of simplifying the formation of the absolute value $|z| = \sqrt{a^2 + b^2}$ is the so called magnitude estimator. The magnitude estimator estimates the magnitude of the complex figure $z = a + j * b$ with the following equation:

$$|z| \approx \alpha * \max(|a|, |b|) + \beta * \min(|a|, |b|),$$

$\alpha$ and $\beta$ being constants whose values are to be selected independently of the desired maximum error and of the complexity of implementation.

When using the magnitude estimator with fixed $\alpha$ and $\beta$, the orders of magnitude of the correlation signal are maintained.

For $\alpha = 1$ and $\beta = 1$, the equation corresponds to the summation of the magnitudes of the real part and the imaginary part. Utilizing the magnitude estimator with the $(\alpha, \beta)$ pair $\alpha = 1$ and $\beta = 0.25$ has turned out to be the most favorable approximation for forming the absolute value.

Possible values of the Alpha*min+Beta*max magnitude estimator are indicated in the table shown in FIG. 9.

The number of partial correlation values is not limited to 16 but may be selected as desired. What follows is a description of the calculation of the correlation value while taking into account the phase position of the partial correlation values with a number N of partial correlations. Initially, the N partial correlations will be calculated, whereby complex partial correlation values $r_{yx,n}[l]$ result. n is the number of the partial correlation, and l is the index of the value. In order to avoid the negative effects of the frequency offset which have been described, the values of two respectively successive partial correlations are subject to complex-conjugated multiplication:

$$\tilde{w}_n[l] = r_{yx,n}[l] \cdot (r_{yx,n-1}[l])^*,$$

wherein $(.)^*$ represents the complex conjugation. Here, a multiplication is performed for each correlation value, i.e. for each index l. For an index l, each of these values $\tilde{w}_n[l]$ possesses, for $N=1$ to $N-1$, phase $\alpha$, which stems from the complex rotation term, i.e. from the frequency offset. An error occurring in phase $\alpha$, however, is caused by noise and distortions from the transmission channel. Eventually, the N-1 values $\tilde{w}_n[l]$ for $n=1$ to $N-1$ may be added up. What results are the correlation values s[l] for each index l. This summation is coherent, i.e. the $\tilde{w}_n[l]$, i.e. the useful signal, add up in terms of amplitude, whereas noise and signal distortions add up in terms of power only. Thus, the relative shares of noise and signal distortions are decreased, in terms of power, by a factor of N-1. With such a linkage of the N-1 values $\tilde{w}_n[l]$ with a fixed l, which are based on the N partial correlation values $r_{yx,n}[l]$ the processing gain is N-1.

In accordance with this embodiment, in the calculation specification for s[l], there is a weighting which is reminiscent of a maximum ratio combining (MRC), which is why the calculation of s[l] entails only a small loss with regard to the possible correlation gain. During the reception of the transmit signal, the signal-to-noise plus interference ratio (SNIR) may change several times, since interfering transmitters are constantly starting or ending the radiation of a signal. In simplified terms, it may be assumed that the SNIR is approximately constant within a partial correlation and that it undergoes only little change even between two adjacent partial correlations. For producing the maximum correlation gain with a time-variant SNIR, the MRC method may be used, while for this weighting, noise plus interference is normalized to a constant value, and subsequently, the receive signal is weighted with its effective complex-conjugated amplitude before the summation to s[l] is performed.

In accordance with the present invention, correlation values which are output as complex values or real values are calculated in a roundabout way of using partial correlations. Determining a phase difference between partial correlations is an implicit estimation of the frequency offset between the sequences of values. z[k]=y[k]*conj(x[m]) represents a receive sample y[k] which has been subject to complex-conjugated multiplication by the associated transmit sample x[m], whereby the modulation has been removed. For calculating a partial correlation value, the calculation $$r_{yx,n}[l] = \sum z[k]$$

occurs in accordance with an embodiment, the index k being in the range relevant for these partial correlations n and the current index l. In accordance with this approach, what is not done is to multiply z[k] and conj(z[k−1]), to determine the phase thereof and to average over several such terms for noise reduction, or, alternatively, to first perform averaging and then a phase determination, but what is performed is the conjugated multiplication between partial correlations $r_{yx,n}[l]$ and $r_{yx,n-1}[l]$.

A weighting takes place implicitly. When calculating $\tilde{w}_n[l]$, each partial correlation $r_{yx,n}[l]$ is weighted with $$r'_{yx}[l] = \sum_{n=0}^{N-1} e^{-j\alpha \cdot n} r_{yx,n}[l]$$

for n=1 to N−1. On account of the assumption of a small SNIR change between adjacent partial correlations, this is approximately the effective complex-conjugated amplitude of $r_{yx,n}[l]$, except for the phase difference α, which, however, has no destructive effect on the correlation values s[l] because of the above calculation specification. Like with MRC, reliable partial correlations thus are more highly represented in the sum s[l] than highly disturbed, unreliable partial correlations.

In accordance with this embodiment, one only needs to work with the amplitudes of the correlation values s[l] in the further course of the algorithm. In addition, the arising values may be represented differently in the implementation, if need be, for example as a root of the correlation value s[l] or as logarithmized values so as to reduce the memory requirement of the correlation values s[l]. This may be necessary, since due to the conjugate multiplication, the dynamic range of the correlation values on the linear scale has been squared.

The combination of the partial correlations over the conjugated multiplication and, subsequently, averaging of the products is robust against a frequency offset, the frequency offset having to be estimated neither explicitly nor implicitly.

In accordance with a further embodiment, the processing means shown in FIG. 1 is configured to determine an mean phase difference between the partial correlation values. In addition, the processing means is configured to determine a certain partial correlation value as a reference correlation value and to output same in an unchanged manner as a processed partial correlation value. The phase terms of the further partial correlation values are corrected in accordance with the mean phase difference, so that the phase terms of the processed further partial correlation values correspond to the phase term of the reference correlation value. If the first partial correlation value is defined as the reference correlation value, the second partial correlation value is rotated back by the simple phase difference so as to bring about an overlap of the processed second partial correlation value with the processed first partial correlation value. The third partial correlation value is rotated back by double the mean phase difference. Alternatively, the partial correlation values may also be rotated forward or be reflected before the rotation to enable an implementation of the overlap.

As has been described with reference to FIG. 2, the phase change between two successive partial correlation values $r_{yx,n}[l]$ ideally is constant. If the phase change α is estimated correctly, then the N complex partial correlation values may be added up coherently in the following manner:

$$r'_{yx}[l] = \sum_{n=0}^{N-1} e^{-j\alpha \cdot n} r_{yx,n}[l]$$

Here, the respective n.th partial correlation value, respectively, is thus rotated backed by the angle n·α and is added up to the 0.th partial correlation value. The result $r'_{yx}[l]$, which is referred to as the variable name corrvals, is close to the actual correlation value which would exist in the event of there being no frequency offset, i.e. no continuous phase difference. This applies to any desired indices l=0, . . . , t_nocorrvals−1, not just for l=L. Thus, the entire cross-correlation sequence may be calculated with a very good approximation due to the partial correlation values being linked.

It is obvious from the calculation specification for $r'_{yx}[l]$ that in the summation of the partial correlation values, what is required is not actually angle α, but a complex rotation term $e^{j\alpha}$, which will be referred to as the name comrotterm in the following. This rotation term may be estimated by first finding index l, for which the phase change α is to be estimated from the partial correlation values $r_{yx,n}[l]$. In this embodiment, the correct value would be l=L. This index maxind0, referred to as $\hat{l}$ in the following, may be found by adding up the magnitudes of all N partial correlation values $r_{yx,n}[l]$ with the same index l and then searching for the maximum magnitude sum of all indices l=0, . . . , t_nocorrvals−1:

$$\hat{l} = \arg\max_l \sum_{n=0}^{N-1} |r_{yx,n}[l]|$$

For this index $\hat{l}$, the N−1 phase changes between two respectively successive partial correlations are now determined. However, this phase change is determined as a complex rotation term $$w_n = r_{yx,n}[l] \cdot r^*_{yx,n-1}[l],$$

for n=1, ..., N−1. The magnitude of these rotation terms $w_n$ is generally different from 1, but their magnitude takes into account the size and thus the reliability of the partial correlation values involved in calculating them.

The rotation term $e^{j\alpha}$ actually searched for is obtained by summing the N−1 rotation terms $$e^{j\alpha} \propto w = \sum_{n=1}^{N-1} w_n.$$

Here, each rotation term involved is implicitly weighted with its reliability. This means that a large magnitude corresponds to a high reliability and thus leads to a high weight in the sum.

The rotation term $e^{j\alpha}$ required is not to amplify in the coherent adding and therefore should have the magnitude 1. Therefore, it does not equal w, but is only proportional thereto. Averaging over N−1 rotation terms $w_n$ results in an improved estimation when there are signal interferences, among other things due to thermal noise and phase jitter, when individual partial correlation values may be highly corrupted.

The rotation term comrotterm searched for is obtained by normalizing from w $$e^{j\alpha} = \frac{w}{|w|}.$$

In accordance with a further embodiment, the device for determining a correlation value is part of a receiver configured to receive a T burst in the form of the first sequence of values. Here, a channel bit is also transmitted in each T burst. This bit controls a phase jump after half of the T burst. This means that for channel bit=0, the T burst is transmitted such as it exists, in the receiver also, as a correlation sequence in the form of the second sequence of values. By contrast, for channel bit=1, the second half to the T burst is multiplied by −1. This possible phase jump by 180° always occurs in the burst center, also for zero-padded T bursts as are programmed into the transmitter and/or as exist as a correlation sequence in the receiver.

In accordance with this embodiment, however, the second half of the T burst present in B_samples is not multiplied by −1, but this multiplication occurs in an underlying QPSK symbol sequence which becomes the T burst, in B_samples, by sampling the output of a transmit pulse former. However, this fact may be neglected in the following, since the influence on the algorithm presented is marginal because the transition area between the burst halves is short in comparison with the partial correlation lengths and only has little energy. It may thus be assumed that the second half of the burst is multiplied by +/−1 if a 0/1 is to be transmitted.

Figure 10:
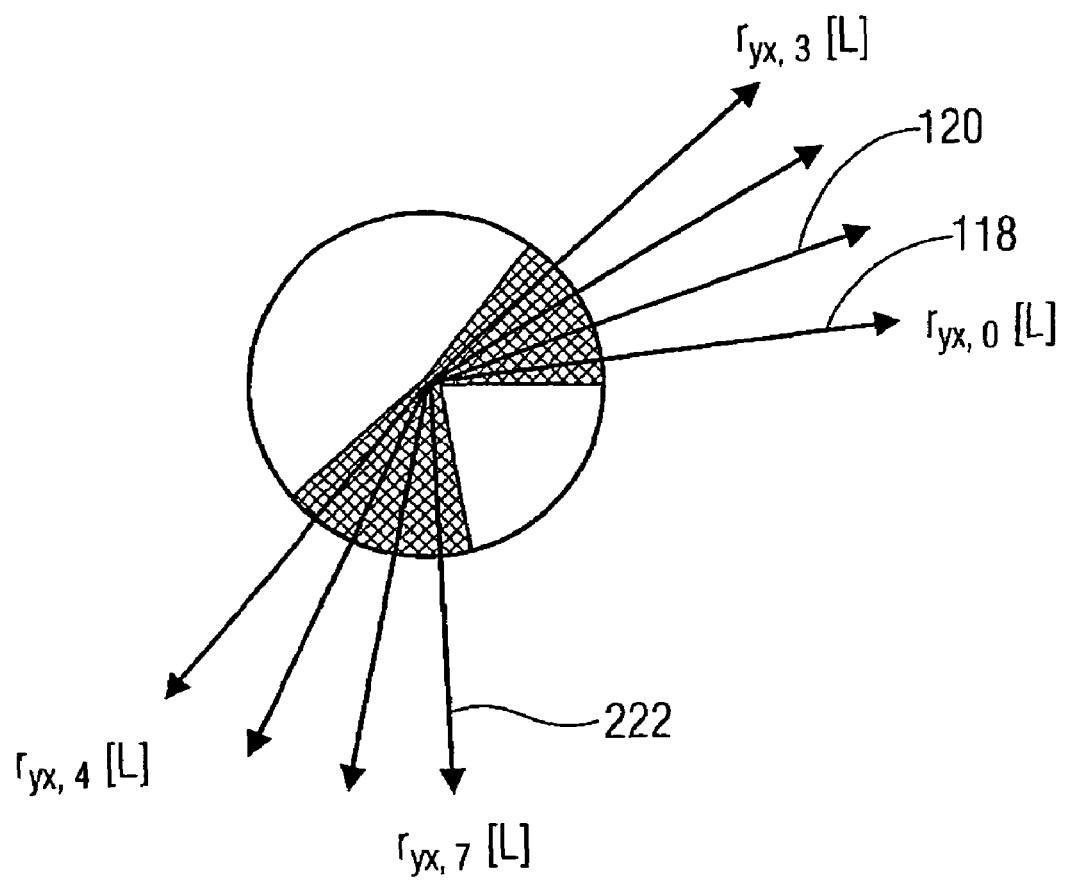
FIG. 10 is a graphic representation of partial correlation values in accordance with a further embodiment of the present invention.

It may be seen from FIG. 10 that the partial correlation values $r_{yx,n}[l]$ undergo a similar phase jump about 180°. The phase jump may be recognized between the partial correlation values $r_{yx,3}[l]$ and the partial correlation value $r_{yx,4}[l]$.

Consequently, in order to detect the channel bit, what needs to be done is only to detect this phase jump.

In principle, the phase jump may be read from $w_{N/2}$. However, this rotation term $w_{N/2}$ also contains a fraction which corresponds to the phase change α due to the frequency offset. This fraction α must be compensated for. The following approach lends itself to achieve this:

Initially, the phase change α is implicitly estimated from all remaining rotation terms wherein no phase jump due to channel bits may occur:

$$\tilde{w} = \sum_{n=1}^{N/2-1} w_n + \sum_{n=N/2+1}^{N-1} w_n$$

A compensation for the phase change and a detection of the channel bit, the estimated channel bit being referred to as transmitbit, are now performed in accordance with the following rule. transmitbit=1 for $Re(w_{N/2} \cdot \tilde{w}^*) < 0$, i.e. the phase jump after compensation is between 90° and 270°. Otherwise, transmitbit=0, i.e. the phase jump is between −90° and +90°. With this information, the mean rotation term now may also be included into the calculation of w. $w = \tilde{w} - w_{N/2}$ applies for transmitbit=1, and $w = \tilde{w} + w_{N/2}$ applies for transmitbit=0.

Instead of calculating corrvals, i.e. $r'_{yx}[l]$, for l=0, ..., t_nocorrvals−1, after $$r'_{yx}[l] = \sum_{n=0}^{N-1} e^{-j\alpha \cdot n} r_{yx,n}[l],$$

as described, a variant lends itself for this purpose, which additionally also takes into account the described phase jump by a transmitted channel bit, and compensates for same:

$$r'_{yx}[1] = \sum_{n=0}^{N/2-1} e^{-j\alpha \cdot (n-N/2)} r_{yx,n}[1] \cdot (\pm 1) +$$
$$\sum_{n=N/2}^{N-1} e^{-j\alpha \cdot (n-N/2)} r_{yx,n}[1]$$
$$= \sum_{n=0}^{N/2-1} e^{-j\alpha \cdot (N/2-n)} r_{yx,n}[1] \cdot (\pm 1) +$$
$$r_{yx,N/2}[1] + \sum_{n=1}^{N/2-1} e^{-j\alpha \cdot (N/2-n)} r_{yx,N-n}[1]$$

For transmitbit=1, the first sum is multiplied by −1, with transmitbit=0, it is multiplied by +1. Actually, the latter sum would have to be multiplied by +/−1, but the variant shown is equivalent.

This calculation specification has the advantage that there is less delay, in the implementation, when cascading in accordance with the Horner scheme is used, i.e., for example $$((r_{yx,0}[l] \cdot e^{j\alpha} + r_{yx,0}[l]) \cdot e^{j\alpha} + r_{yx,0}[l]) \cdot e^{j\alpha} + \ldots$$

A further advantage is that the phase in the rotation term cannot be estimated in an error-free manner, as a rule, so that in the first linking variant in accordance with $$r'_{yx}[1] = \sum_{n=0}^{N-1} e^{-j\alpha \cdot n} r_{yx,n}[1]$$

up to the (N−1)-fold of this phase error occurs in the sum, by multiplying the erroneous phase by N−1. In the variant last shown, which represents an improved coherent addition of the partial correlations, the N/2-fold, at a maximum, of this phase error makes itself felt.

If the normalization of comrotterm $$e^{j\alpha} = \frac{w}{|w|}$$

cannot be performed in a highly accurate manner, a multiplication by the rotation term $e^{j\alpha}$ in fact signifies a multiplication by $C \cdot e^{j\alpha}$, wherein $C \neq 1$, i.e. in addition to a phase rotation, always also a gain or attenuation of individual partial correlation values. Undesirably, this changes the shape of the resulting cross-correlation sequence. This source of error is reduced with the variant last presented, since the gain is N/2-fold at a maximum, instead of being (N−1)-fold as in the first variant.

In accordance with a further embodiment, in the device for determining a correlation value, further values are calculated in a partial correlation algorithm implemented in the device. These further values are required, for example, in a sequence control of a receiver.

For the SNIR estimation, the maximum squared correlation magnitude maxsqcorr is required, for example. This is the value $|r'_{yx}[\hat{l}]|^2$ for the $\hat{l}$ calculated above.

What is also needed for the SNIR estimation is the energy recenerg of the receive signal for the duration of the T burst. This energy may be calculated by means of formula $$recenerg = \sum_{k=\hat{l}}^{\hat{l}+NM-1} |y[k]|^2$$

It must be noted that y[k] is complex-valued, and thus the power of each sample is composed of the power in the I component and the Q component. What is also calculated is the energy for that signal portion which is an optimum match with the correlation sequence x[k] of the length t_paddcorrseqlen=N*M. Since this correlation sequence is zero-padded, the energy is summed up, even in the ideal case, not only over the window containing the useful signal, but it is also summed over a signal portion containing only noise plus padded zeros. The summation over a longer window of the receive signal than the actual T burst would lead to an erroneous SNIR estimation. In the sequence control, this systematic error is balanced out by means of the correction term SNIRcorrfact.

In the following, the course of the partial correlation calculation will be described in accordance with a method as is implemented in the device for determining a correlation value in accordance with an embodiment of the present invention. The calculations described may be realized, for example, in the form of a Matlab function.

A first step involves determining, via the current parameter t_choice of the sequence control, whether a correlation is to be effected to a T burst 0 or 1 of the transmitter contemplated, i.e. the correct partial correlation sequences partcorrseqs for this transmitter are selected; as has already been described, the transmitter may choose between two possible T bursts. The partial correlation sequences here correspond to the subsets of the second sequence of values in accordance with FIG. 1.

In a second step, the respective t_nocorrvals partial correlation values $r_{yx,n}[l]$ are determined for each of the t_nopartcorrs partial correlations.

A third step involves determining maxin0.

A fourth step involves determining $\tilde{w}$, a fifth step step involves determining the transmitbit and w, a sixth step involves determining comrotterm, a seventh step involves determining corrvals, and an eighth step involves determining maxsqcorr and recenerg.

If need be, several of the steps indicated above may be simplified, for example by suboptimal implementation, or may be swapped out to a further software module if, for example, their FPGA implementation were too expensive. If the algorithm is implemented in an FPGA, the computationally intensive operations, i.e. primarily the summations over long vectors, as occur in the partial correlation calculations and in the calculation of recenerg will have to remain in the FPGA at any rate.

Figure 11:
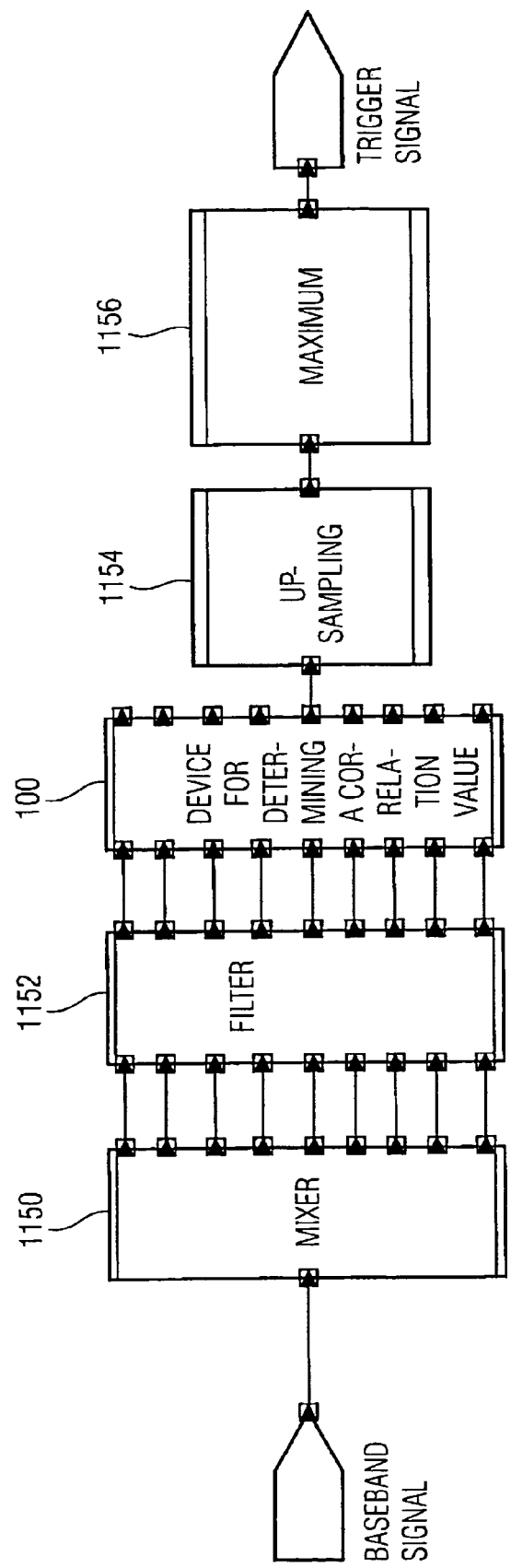
FIG. 11 is a block diagram of a receiver with a device for determining a correlation value in accordance with an embodiment of the present invention.

FIG. 11 shows a block diagram of a receiver of a digital transmission system with a device 100 for determining a correlation value in accordance with an embodiment of the present invention. A mixer 1150 passes on a receive signal mixed into the (complex) baseband to a filter 1152 in a sample clock B_clock. A filter 1152 is connected downstream from mixer 1150. A receive signal generated by the matched filter 1152 is received in the successive device 100 for determining a correlation value. The receive signal which, in accordance with FIG. 1, corresponds to the first sequence of values, is correlated, in the device 100, with a known signal sequence corresponding the second sequence of values. The device 100 is configured to continuously provide correlation magnitude values, from which the maximum is subsequently determined. The correlation magnitude values may be up-sampled in a subsequent up-sampling block 778. In the subsequent means 1156 for detecting a correlation maximum value, the position of the correlation maxima is calculated, and a trigger signal is output.

Figure 12:
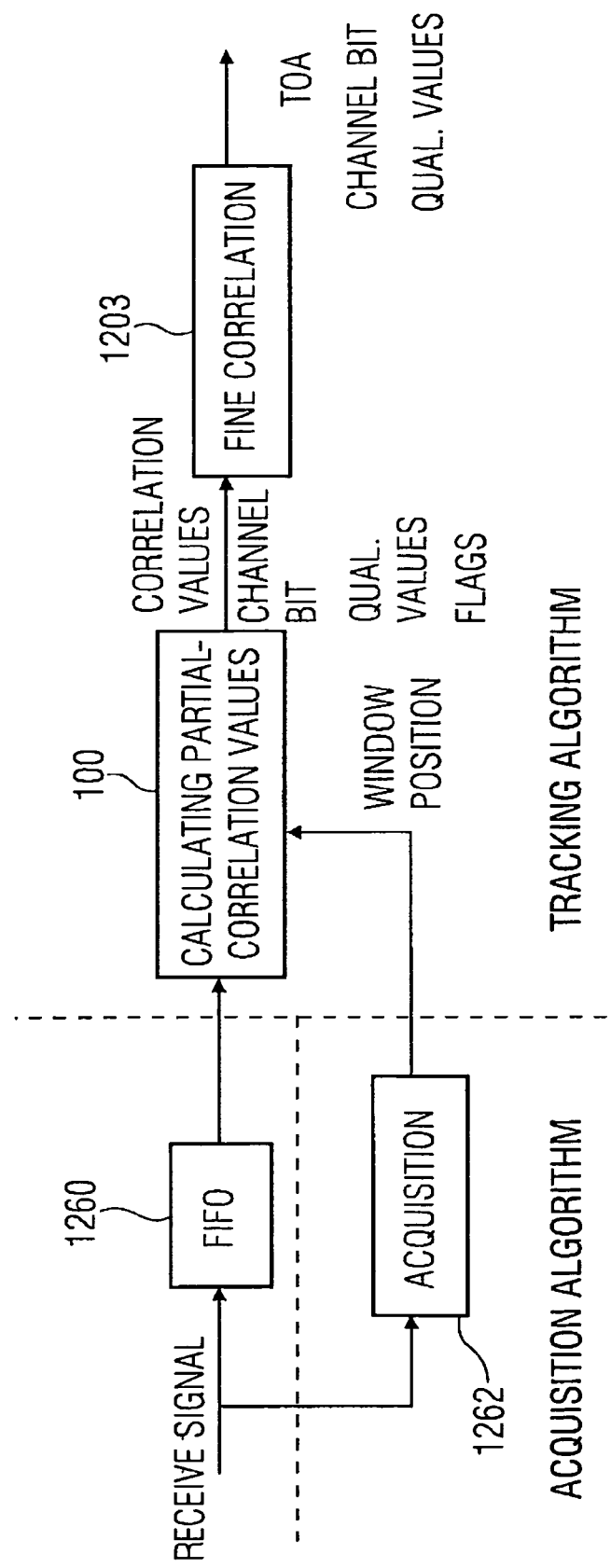
FIG. 12 is a block diagram of a further embodiment of the present invention.

FIG. 12 shows a graphic block representation of an inclusion of a device for determining a correlation value in accordance with an embodiment of the present invention into a receiver. The device 100 for determining a correlation value receives a receive signal via a FIFO 1260. An acquisition means 1262 indicates, to device 100, a window position over which the partial correlations are calculated in the device 100. The device 100 is configured to provide the correlation values determined to a fine-correlating means 1203. In addition to the correlation value, device 100 provides information about a channel bit, quality values as well as flags to the fine-correlating means 1203. The fine-correlating means 1203 is configured to determine a maximum from the correlation values using a decision concerning a maximum, from which maximum, in turn, the time of arrival of a burst contained in the receive signal is determined. The input basesig of the signal processing chain shown in FIG. 12 represents a receive signal from an antenna unit which exists in a state in which it has been down-converted into the complex baseband and is thus present in the I and Q components, and has been sampled in a sample clock B_clock. This interphase is realized as lines on a correlation board.

For the processing of each receive signal of the transmitter shown in this embodiment (not shown in the figures), the signal processing shown in FIG. 12 may roughly be subdivided into the following parts of acquisition, partial correlation calculation and fine correlation. The acquisition includes a continuous search for an A burst for synchronizing the receiver to the transmitter. In the partial correlation calculation for the tracking, which forms the most computationally intensive part of the tracking algorithm, which only operates on sections or windows of the receive signal, the T burst is searched for in the raster B_samples. The fine correlations are performed in the oversampling clock. The fine-correlating means 1203 works with the correlation values from the partial correlation calculation 100 and searches for the T burst in a very fine raster.

The acquisition algorithm utilizes A bursts in the receive signal to predict the approximate position of a T burst in the receive signal.

Before being input into the tracking algorithm, the receive signal is delayed in a calculated manner with a FIFO. Due to the position prediction of the acquisition algorithm, the tracking algorithm cuts out a window from the receive signal, within which window the T burst is searched for.

This search is conducted in two steps. The first step involves determining the correlation values for the T burst in the raster B_sample in the predicted window. The calculation is conducted using partial correlations to clearly reduce the influence of a frequency offset on the correlation values. In addition, a transmitted channel bit is extracted, and several quality values for the receive signal are determined.

The correlation values, the estimated channel bit, the quality values as well as signalization flags are utilized for interpolating the correlation values in a raster very much finer than B_sample. This is referred to as fine correlation. Here, a highly precise estimation of the time of arrival of the burst is effected. In addition, further quality values are determined from the correlation values.

Figure 13:
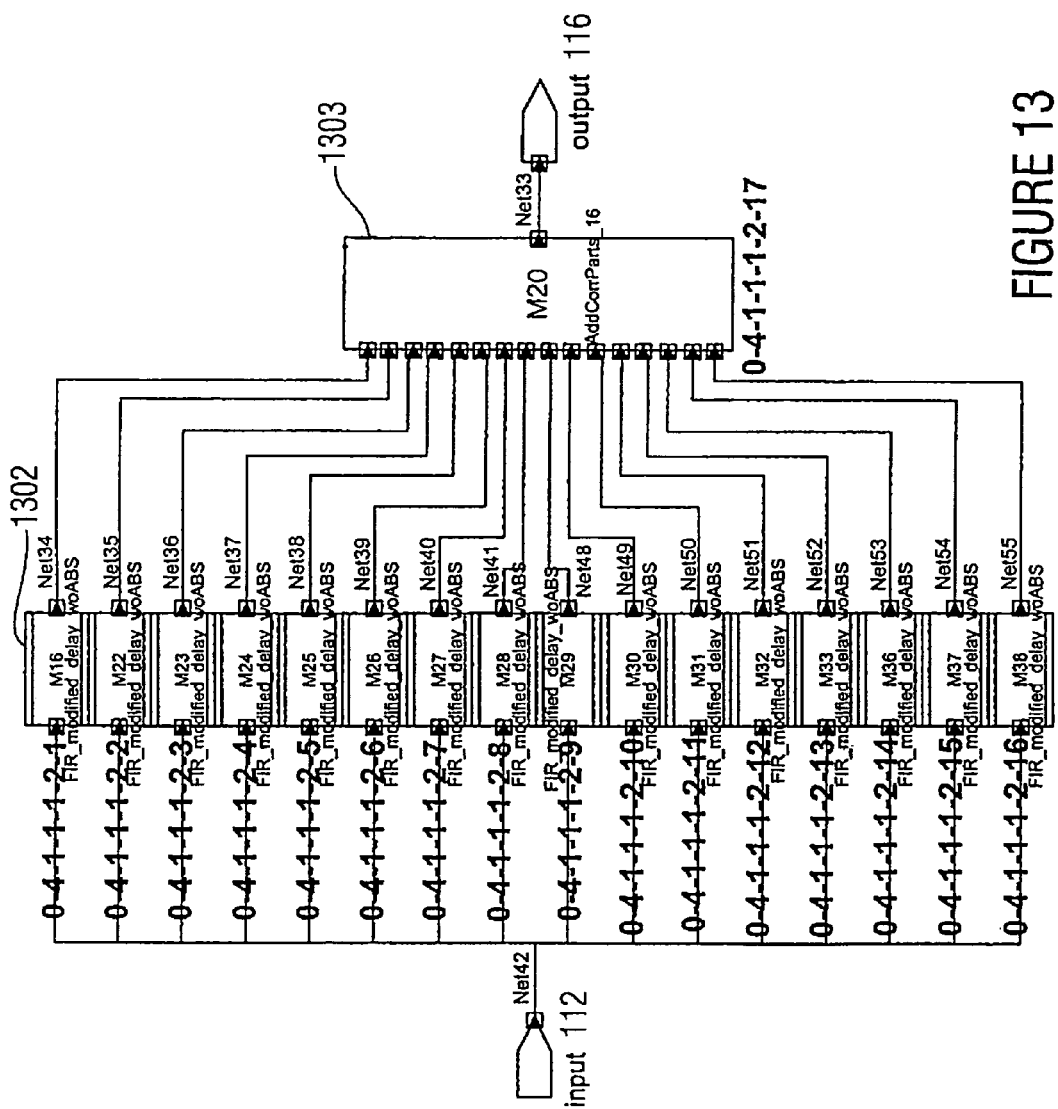
FIG. 13 is a block diagram of a correlation means in accordance with an embodiment of the present invention.

FIG. 13 shows a diagramatic representation of a device for determining a correlation value in accordance with an embodiment of the present invention. What is shown is an architecture of a correlation filter with a_nopartcorrs=16 partial correlators 1302.

Figure 14:
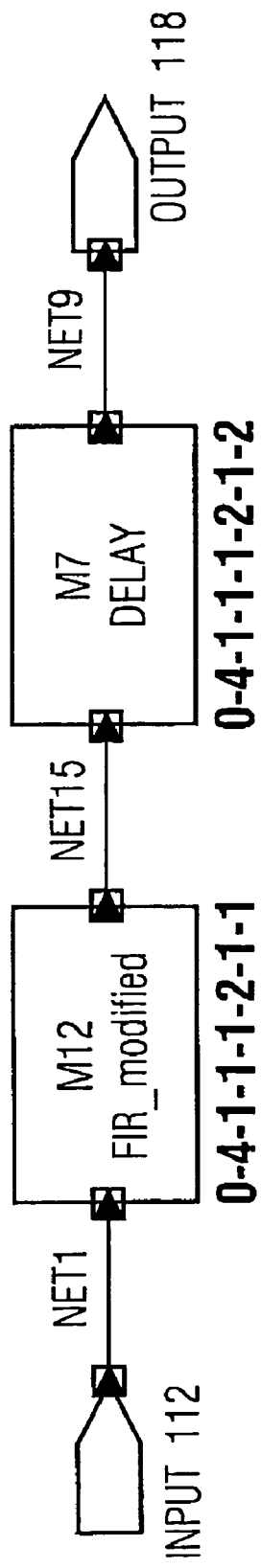
FIG. 14 is a block diagram of a means for determining a partial correlation value in accordance with an embodiment of the present invention.

Initially, the input signal Input 112 is passed, unchanged, to the 16 partial correlation filters, the architecture of which is shown in FIG. 14. Since the filtered signals come from the partial correlators, they are applied in parallel to the 16 ports of the linking means 1303, which includes the functions of the processing means shown in FIG. 1 and of the calculating means. The output of the device shown in FIG. 13 is real, since the absolute value of the signal Output 116 is formed at the end of the linking means 1303. The outputs of the 16 partial correlators are complex.

FIG. 14 shows a diagrammatic representation of a partial correlation filter 1302 shown in FIG. 13. The partial correlation filter is configured to receive a first sequence of values 112 and to output a first partial correlation value 118. The partial correlation filter comprises a filter M12 as well as a delaying member M7 connected to each other. The signals on nets net1, 9, 15 are complex and comprise a data rate B_clock_48. The block diagram is identical for all a_nopartcorrs partial correlation filters. Initially, the applied signal is filtered in block 0-4-1-1-1-2-1-1 and is subsequently delayed in block 0-4-1-1-1-2-1-2. Differences between the partial correlation filters exist in the different filter coefficients and in the different delays. The different filter coefficients and the different delays depend on the respective subsets of the sequences of values. The delays are required in order that all partial correlations match in terms of time and can be rejoined, after this level, to form a correlation signal.

The subdivision of the filter coefficients is conducted in accordance with the following scheme. The real elements of the acquisition burst a_burstseq are real_a_burstseq. The imaginary elements of the acquisition burst a_burstseq, which only exist in the event of a quaternary reference sequence, are imag_a_burstseq. The length of the correlation sequences real_a_burstseq and imag_a_burstseq is a_burstlen. a_nopartcorrs is the number of partial correlators.

$$partcorrlen = \left\lceil \frac{a\_burstlen}{a\_nopartcorrs} \right\rceil$$

is the number of filter coefficients in a subfilter. For example, the partial correlation filter 1 of level 0-4-1-1-1-2-1 thus possesses the following coefficients:

real_a_burstseq(a_burstlen to a_burstlen−partcorrlen+1), conj(imag_a_burstseq(a_burstlen to a_burstlen−partcorrlen+1));

The partial correlation filter 2 of level 0-4-1-1-1-2-2 possesses the following coefficients:

real_a_burstseq(a_burstlen−partcorrlen to a_burstlen−2*partcorrlen+1), conj(imag_a_burstseq(a_burstlen−partcorrlen to a_burstlen−2*partcorrlen+1));

And the correlation filter n possesses the following coefficients:

real_a_burstseq(a_burstlen−(n−1)*partcorrlen to a_burstlen−n*partcorrlen+1), conj(imag_a_burstseq(a_burstlen−(n−1)*partcorrlen to a_burstlen−n*partcorrlen+1)).

The partial correlation filter a_nopartcorrs possesses the following coefficients in the event of 16 partial correlators:

real_a_burstseq(partcorrlen to 1, zeros(1 to a_nopartcorrs*partcorrlen−a_burstlen)), conj(imag_a_burstseq(partcorrlen to 1), zeros(1 to a_nopartcorrs*partcorrlen−a_burstlen)).

The number of delay elements is also dependent on the number of the partial correlation filter. No zeros need to be inserted in the partial correlation filter 1, partcorrlen zeros need to be inserted in the partial correlation filter 2, (n−1)*partcorrlen zeros need to be inserted in the partial correlation filter n, and (a_nopartcorrs−1)*partcorrlen zeros need to be inserted in the partial correlation filter a_nopartcorrs.

a_corrburst is to refer to the following signal.

a_corrburst=[flipr(conj(a_burstseq)), zeros(1, a_nopartcorrs*partcorrlen−a_burstlen)].

Thus, the coefficients a_corrburst((ii−1)*partcorrlen+1 bis ii*partcorrlen) belong to the partial correlation filter ii.

An estimation of the frequency offset coffsestppm is conducted by means of formula coffsestppm=angle(comrotterm)/ (2*π*t_partcorrseqlen/B_clock)/carfreq*1e6.

The mean square root with the amplitude of the received complex signal is estimated during the entire correlation sequence, i.e. the concatenation of all partial correlations. One observes that the T burst may be clearly shorter than the correlation sequence, so that the resulting RMS during the correlation sequence is much smaller than it would be if it were measured during the T burst only.

The preceding parameters will be defined in the following FIGS. 15a to 15p.

The parameter a_corrburst defines the correlation signal which, in accordance with FIG. 1, corresponds to the first sequence of values.

The parameter a_corrburstlen defines the length of the correlation signal in symbols.

The parameter comrotterm defines the estimated rotation term for compensating for a frequency offset in the partial correlations.

The parameter corrvals defines complex correlation values calculated in the FPGA.

The parameter maxind0 defines an index, counted from zero, of the correlation value corrvals with the maximum magnitude.

The parameter recenerg defines the energy of the receive signal as a sum of I und Q components calculated over the estimated position of the T burst within the window.

The parameter t_nocorrvals defines the number of tracking partial correlation values.

The parameter t_nopartcorrs defines the number of tracking partial correlations for controlling the frequency offset.

The parameter t_paddcorrseqlen defines the overall length of the tracking partial correlation sequences, which are zero-padded if need be. The parameter must be a multiple of t_nopartcorrs. It should be about t_burstmaxlen or, if necessary, smaller, and be the same for all transmitters.

The parameter t_partcorrseqlen defines the length of each tracking partial correlation sequence.

The parameter t0_partcorrseqs defines the tracking partial correlation sequences for the T burst 0 of the transmitter contemplated.

The parameter t1_partcorrseqs defines tracking partial correlation sequences for the T burst 1 of the transmitter contemplated.

The parameter transmitbit defines the estimated channel bit transmitted.

The parameter to a defines the estimated time of arrival (TOA) of the T-burst start.

The parameter winstartpos defines the time stamp of the start of the window in which the correlation values have been calculated.

The parameter a_nopartcorrs defines the number of partial correlations in the receive algorithm of the acquisition burst.

Even though reference has been made to a digital communication system in the preceding embodiments, the inventive approach for determining a correlation value may be utilized for any sequences of values desired. The partial correlation values may be determined by means of cross-correlations, auto-correlations or other types of correlation. The inventive approach may be employed, in particular, for correlation sequences with complex values, but also works for real-valued correlation sequences.

Depending on the circumstances, the inventive method for determining a correlation value may be implemented in hardware or in software. The implementation may be effected on a digital storage medium, in particular a disc or CD with electronically readable control signals which may be cooperate with a programmable computer system such that the respective method is performed. Generally, the invention thus also consists in a computer program product with a program code, stored on a machine-readable carrier, for performing the inventive method when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for determining a correlation value from a correlation between a first sequence of values with complex values and a second sequence of values with complex values, wherein the first sequence of values is part of a receive sequence, and wherein the second sequence of values is a transmit sequence, and wherein the transmit sequence stems from a transmitter, the device comprising:
   a correlator configured to determine a first partial correlation value from a correlation between a first subset of the first sequence of values and a first subset of the second sequence of values, and a second partial correlation value from a correlation between a second subset of the first sequence of values and a second subset of the second sequence of values;
   a processor configured to determine a processed partial correlation value with an adjusted phase term from the first partial correlation value or the second partial correlation value; and
   a calculator configured to determine the correlation value using the processed partial correlation value,
   wherein the partial correlation values have different phase terms in a complex plane, and wherein the processor is configured to determine the adjusted phase term of the processed partial correlation value in dependence on the phase terms of the partial correlation values.

2. The device as claimed in claim 1, wherein the correlator is configured to determine the subsets from the first and second sequences of values in accordance with a common subdivision specification.

3. The device as claimed in claim 1, wherein the processor is configured to determine a processed first partial correlation value from the first partial correlation value, and a processed second partial correlation value from the second partial correlation value, and wherein the calculator is configured to determine the correlation value by means of an overlap of the processed partial correlation values.

4. The device as claimed in claim 3, wherein the processor is configured to determine the processed partial correlation values by means of forming the magnitude from the partial correlation values.

5. The device as claimed in claim 1, wherein the processor is configured to determine the processed partial correlation value from a complex-conjugated multiplication of the first and second partial correlation values.

6. The device as claimed in claim 5, wherein the calculator is configured to determine the processed partial correlation value as the correlation value.

7. The device as claimed in claim 5, wherein the correlator is configured to determine a further partial correlation value from a correlation between a further subset of the first sequence of values and a further subset of the second sequence of values, and wherein the processor is configured to determine a processed second partial correlation value from a complex-conjugated multiplication of the second and the further partial correlation values, and wherein the calculator is configured to determine the correlation value from an overlap of the processed first and second partial correlation values.

8. The device as claimed in claim 1, wherein the processor is configured to determine a phase difference between the partial correlation values, and to determine the second processed partial correlation value as the second partial correlation value corrected by the phase difference, and wherein the calculator is configured to determine the correlation value from the second processed partial correlation value and the first partial correlation value.

9. The device as claimed in claim 7, wherein the correlator is configured to determine a further partial correlation value from a correlation between a further subset of the first sequence of values and a further subset of the second sequence of values, and wherein the processor is configured to determine the further processed partial correlation value as the further partial correlation value corrected by the phase difference, and wherein the calculator is configured to determine the correlation value from an overlap of the first partial correlation value and the processed second and further partial correlation values.

10. The device as claimed in claim 8, wherein the processor is configured to determine the phase difference as a mean phase difference between the partial correlation values and to reduce wherein the phase terms of the processed second and further partial correlation values in accordance with the mean phase difference in order to adjust the phase terms of the processed second and further partial correlation values to the phase term of the first partial correlation value.

11. The device as claimed in claim 8, wherein the processor is configured to determine the phase difference as a mean phase difference between the partial correlation values and to reduce the phase term of the processed second partial correlation value in accordance with the mean phase difference and to increase the phase term of the further partial correlation value in accordance with the mean phase difference in order to adjust the phase terms of the processed second and further partial correlation values to be phase term of the first partial correlation value.

12. The device as claimed in claim 8, wherein the processor is configured to determine the phase difference as a normalized sum of complex-conjugated multiplications of adjacent partial correlation values.

13. The device as claimed in claim 1, wherein the receive sequence and the transmit sequence comprise a frequency offset, and wherein the processor is configured to determine the frequency offset.

14. A method for determining a correlation value from a correlation between a first sequence of values with complex values and a second sequence of values with complex values, wherein the first sequence of values is part of a receive sequence, and wherein the second sequence of values is a transmit sequence, and wherein the transmit sequence stems from a transmitter, the method comprising:

determining, by means of a correlator, a first partial correlation value from a correlation between a first subset of the first sequence of values and a first subset of the second sequence of values, and a second partial correlation value from a correlation between a second subset of the first sequence of values and a second subset of the second sequence of values;

determining, by means of a processor, a processed partial correlation value with an adjusted phase term from the first partial correlation value or the second partial correlation value; and determining, by means of a calculator, the correlation value using the processed partial correlation value, wherein the partial correlation values have different phase terms in a complex plane, and wherein the processor is configured to determine the adjusted phase term of the processed partial correlation value in dependence on the phase terms of the partial correlation values.

15. A computer readable medium storing computer executable instructions for performing a method for determining a correlation value from a correlation between a first sequence of values with complex values and a second sequence of values with complex values wherein the first sequence of values is part of a receive sequence, and wherein the second sequence of values is a transmit sequence, and wherein the transmit sequence stems from a transmitter, the method comprising:

determining, by means of a correlator, a first partial correlation value from a correlation between a first subset of the first sequence of values and a first subset of the second sequence of values, and determining a second partial correlation value from a correlation between a second subset of the first sequence of values and a second subset of the second sequence of values;

determining, by means of a processor, a processed partial correlation value with an adjusted phase term from the first partial correlation value or the second partial correlation value; and determining, by means of a calculator, the correlation value using the processed partial correlation value, wherein the partial correlation values have different phase terms in a complex plane, and wherein the processor is configured to determine the adjusted phase term of the processed partial correlation value in dependence on the phase terms of the partial correlation values.

* * * * *